(12) United States Patent
Finn et al.

(10) Patent No.: US 11,853,876 B2
(45) Date of Patent: Dec. 26, 2023

(54) CONTROL POLICIES FOR ROBOTIC AGENTS

(71) Applicant: Google LLC, Mountain View, CA (US)

(72) Inventors: Chelsea Breanna Finn, Mountain View, CA (US); Sergey Vladimir Levine, Mountain View, CA (US)

(73) Assignee: Google LLC, Mountain View, CA (US)

( * ) Notice: Subject to any disclaimer, the term of this patent is extended or adjusted under 35 U.S.C. 154(b) by 901 days.

(21) Appl. No.: 16/332,961

(22) PCT Filed: Sep. 15, 2017

(86) PCT No.: PCT/US2017/051751
§ 371 (c)(1),
(2) Date: Mar. 13, 2019

(87) PCT Pub. No.: WO2018/053246
PCT Pub. Date: Mar. 22, 2018

(65) Prior Publication Data
US 2019/0251437 A1   Aug. 15, 2019

Related U.S. Application Data (60) Provisional application No. 62/395,329, filed on Sep. 15, 2016.

(51) Int. Cl.
*G06N 3/08* (2023.01)
*G06N 3/008* (2023.01)
(Continued)

(52) U.S. Cl.
CPC ............... *G06N 3/08* (2013.01); *G06N 3/008* (2013.01); *G06N 3/04* (2013.01); *G06N 3/044* (2023.01); *G06N 3/045* (2023.01)

(58) Field of Classification Search
CPC .......... G06N 3/08; G06N 3/045; G06N 3/044; G06N 3/008; G06N 3/04
See application file for complete search history.

(56) References Cited

U.S. PATENT DOCUMENTS

| 5,805,733 A | 9/1998 | Wang et al. |
| 2005/0240412 A1 | 10/2005 | Fujita |
| (Continued) | | |

FOREIGN PATENT DOCUMENTS

| CN | 101624097 A | 1/2010 |
| CN | 101625734 A | 1/2010 |
| (Continued) | | |

OTHER PUBLICATIONS

Fasola, Juan, Paul E. Rybski, and M. Veloso. "Fast goal navigation with obstacle avoidance using a dynamic local visual model." Proc. of SBAI'05, The VII Brazilian Symposium of Artificial Intelligence. 2005. (Year: 2005).*

(Continued)

*Primary Examiner* — Omar F Fernandez Rivas
*Assistant Examiner* — Shamcy Alghazzy
(74) *Attorney, Agent, or Firm* — Fish & Richardson P.C.

(57) ABSTRACT

A method includes: receiving data identifying, for each of one or more objects, a respective target location to which a robotic agent interacting with a real-world environment should move the object; causing the robotic agent to move the one or more objects to the one or more target locations by repeatedly performing the following: receiving a current image of a current state of the real-world environment; determining, from the current image, a next sequence of actions to be performed by the robotic agent using a next image prediction neural network that predicts future images (Continued)

based on a current action and an action to be performed by the robotic agent; and directing the robotic agent to perform the next sequence of actions.

16 Claims, 3 Drawing Sheets

(51) Int. Cl.
    *G06N 3/044* (2023.01)
    *G06N 3/045* (2023.01)
    *G06N 3/04* (2023.01)

(56) References Cited

U.S. PATENT DOCUMENTS

| | | | | |
|---|---|---|---|---|
| 2010/0298977 | A1* | 11/2010 | Fahn | G05D 1/0246 701/28 |
| 2013/0116826 | A1* | 5/2013 | Kim | G05D 1/0253 901/1 |
| 2015/0127149 | A1* | 5/2015 | Sinyavskiy | G05D 1/0088 700/250 |

FOREIGN PATENT DOCUMENTS

| | | |
|---|---|---|
| JP | H06-266410 | 9/1994 |
| JP | 2002-059384 | 2/2002 |
| JP | 2003-080484 | 3/2003 |
| JP | 2008-544766 | 12/2008 |
| JP | 2013-120465 | 6/2013 |
| JP | 2016-157434 | 9/2016 |
| KR | 20140053149 A | 5/2014 |
| WO | WO 2015/192263 | 12/2015 |

OTHER PUBLICATIONS

Zhang, Zhengtao, De Xu, and Min Tan. "Visual measurement and prediction of ball trajectory for table tennis robot." IEEE Transactions on Instrumentation and Measurement 59.12 (2010): 3195-3205. (Year: 2010).*
Hohl, Lukas, et al. "Aibo and Webots: Simulation, wireless remote control and controller transfer." Robotics and Autonomous systems 54.6 (2006): 472-485. (Year: 2006).*
Walker, Jacob, Abhinav Gupta, and Martial Hebert. "Dense optical flow prediction from a static image." Proceedings of the IEEE International Conference on Computer Vision. 2015. (Year: 2015).*
Tominaga, Masafumi, Hirotaka Ohta, and Shuji Hashimoto. "Image sequence prediction for remote robot control." 2006 IEEE/RSJ International Conference on Intelligent Robots and Systems. IEEE, 2006. (Year: 2006).*
Bartels, Chris, and Gerard de Haan. "Smoothness constraints in recursive search motion estimation for picture rate conversion." IEEE Transactions on Circuits and Systems for Video Technology 20.10 (2010): 1310-1319. (Year: 2010).*
Herman—Inverse_reinforcement_learning_of_behavioral_models_for_online-adapting_navigation_strategies (Year: 2015).*
Otte—A Survey of Machine Learning Approaches to Robotic Path-Planning (Year: 2015).*
Bellingham—Cooperative Path Planning for Multiple UAVs in Dynamic and Uncertain Environments (Year: 2002).*
Asamizu—Acquisition of Body and Object Representation Based on Motion Learning and Planning Framework (Year: 2009).*
Abbeel et al, "An application of reinforcement learning to aerobatic helicopter flight" NIPS, 2007, 8 pages.
Agrawal et al, "Learning to poke by poking: experiential learning of intuitive physics" arXiv, Jun. 2016, 10 pages.
Anderson et al, "Jump: Virtual reality video" SIGGRAPH Asia, Dec. 2016, 15 pages.
Ba et al, "Layer normalization" arXiv, Jul. 2016, 14 pages.

Boer et al, "A Tutorial on the Cross-Entropy Method" CE Tutorial, Sep. 2003, 47 pages.
Boots et al, "Closing the learning-planning loop with predictive state representations" The International Journal of Robotics Research, 2011, 8 pages.
Boots et al, "Learning predictive models of a deep camera & manipulator from raw execution traces" Proceedings of the 2014 IEEE International Conference on Robotics and Automation, May 2014, 8 pages.
Byravan et al, "SE3-nets: learning rigid body motion using deep neural networks" arXiv, Jun. 2016, 8 pages.
Censi et al, "Bootstrapping bilinear models of Simple Vehicles" International Journal of Robotics Research, Dec. 2013, 20 pages.
Collet et al, "Object recognition and full pose registration from a single image for robtic manipulation" Internaional Conference on Robotics and Automatition, 2009, 8 pages.
Cosgun et al, "Push planning for object placement on cluttered table surfaces" IEEE Conference on Intelligent Robots and Systems, Sep. 2011, 6 pages.
Dai et al, "R-fcn: Object detection via region-based fully convolutional networks" arXiv, Jun. 2016, 11 pages.
Deisenroth et al, "Pilco: A model-based and data-efficient approach to policy search" Proceedings of the 28th International Conference on Machine Learning, 2011, 8 pages.
Dogar et al, "A planning framework for non-prehensile manipulation under clutter and uncertainty" Autonomous Robots, 2012, 19 pages.
El Hihi et al, "Hierarchical recurrent neural networks for long-term dependencies" NIPS, 1995, 7 pages.
Endres et al, "Learning the dynamics of doors for robotic manipulation" International Conference on Intelligent Robots and Systems, Nov. 2013, 7 pages.
Espiau et al, "A new approach to visual servoing in robotics" IEEE Transactions on Robotics and Automation, Jun. 1992, 14 pages.
Finn et al, "Deep spatial autoencoders for visuomotor learning" arXiv, Mar. 2016, 9 pages.
Finn et al, "Unsupervised learning for physical interaction through video prediction" arXiv, Jun. 2016, 12 pages.
Hadsell et al, "Learning long-range vision for autonomous off-road driving" Journal of Field Robotics, 2009, 31 pages.
Khatib, "A unified approach for motion and force control of robot manipulators: The operational space formulation" IEEE Journal of Robotics and Automation, Feb. 1987, 11 pages.
Kingma et al, "Auto-encoding variational bayes" arXiv, May 2014, 14 pages.
Lange et al, "Autonomous reinforcement learning on raw visual input data in a real world application" Proceedings of the 2012 International Joint Conference on Neural Networks, Jun. 2012, 8 pages.
Lenz et al, "Deepmpc: Learning deep latent features for model predictive control" Robotics Science and Systems, 2015, 9 pages.
Levine et al, "End-to-end training of deep visuomotor policies" arXiv, Apr. 2016, 40 pages.
Levine et al, "Learning hand-eye coordination for robotic grasping with deep learning and large-scale data collection" arXiv, Aug. 2016, 12 pages.
Lotter et al, "Deep predictive coding networks for video prediction and unsupervised learning" arXiv, May 2017, 18 pages.
Mason, "Mechanics and planning of manipulator pushing operations" International Journal of Robotics Research, 1986, 19 pages.
Mathieu et al, "Deep multi-scale video prediction beyond mean square error" arXiv, Feb. 2016, 14 pages.
McLeod et al, "Psychophysics: How fielders arrive in time to catch the ball" Nature, Nov. 2003, 2 pages.
Mohta et al, "Vision based control of a quadrotor for perching on planes and lines" IEEE International Conference on Robotics and Automation, Jun. 2014, 7 pages.
Murase et al, "Visual learning and recognition of 3-d objects from appearance" International Journal of Computer Vision, 1995, 20 pages.
Murray et al, "A mathematical introduction to robotic manipulation" CRC Press, 1994, 474 pages.

(56) References Cited

OTHER PUBLICATIONS

PCT International Preliminary Report on Patentability in International Application No. PCT/US2017/051751, dated Mar. 19, 2019, 8 pages.

PCT International Search Report and Written Opinion in International Application No. PCT/US2017/051751, dated Dec. 19, 2017, 15 pages.

Pinto et al, "Supersizing self-supervision: Learning to grasp from 50k tries and 700 robot hours" arXiv, Sep. 2015, 8 pages.

Pomerleau, "Alvinn: an autonomous land vehicle in a neural network" NIPS, 1989, 9 pages.

Riedmiller et al, "Reinforcement learning for robot soccer" Autonomous Robots, 2009, 19 pages.

Salganicoff et al, "A vision-based learning method for pushing manipulation" AAAI Technical Report, 1993, 5 pages.

Szegedy et al, "Inception-v4, inception resnet and the impact of residual connections on learning" arXiv, Aug. 2016, 12 pages.

Tassa et al, "Synthesis and stabilization of complex behaviors through online trajectory optimization" IEEE International Conference on Intelligent Robots and Systems, Oct. 2012, 8 pages.

Walker et al, "An uncertain future: forecasting from static images using variational autoencoder", arXiv, Jun. 2016, 17 pages.

Watter et al, "Embed to control: a locally linear latent dynamics model for control from raw images", arXiv, Nov. 2015, 18 pages.

Wilson et al, "Relative end-effector control using cartesian position based visual servoing" IEEE Transactions on Robotics and Automation, Oct. 1996, 13 pages.

Yu et al, "More than a million ways to be pushed: A high-fidelity experimental data set of planar pushing" arXiv, Aug. 2016, 8 pages.

JP Office Action in Japanese Application No. 2019-514296, dated May 11, 2020, 7 pages.

Office Action in Korean Appln. No. 10-2019-7010314, dated Jul. 30, 2022, 11 pages (with English Translation).

EP Office Action in European Application No. 17777714.1, dated Nov. 3, 2021, 9 pages.

KR Office Action in Korean Application No. 10-2019-7010314, dated Oct. 31, 2021, 6 pages (with English translation).

JP Office Action in Japanese Application No. 2019-514296, dated Jan. 4, 2021, 7 pages (with English translation).

Office Action in Chinese Appln. No. 201780063614.6, dated Sep. 13, 2022, 20 pages (with English Translation).

Office Action in Korean Appln. No. 10-2019-7010314, dated Feb. 28, 2023, 9 pages (with English Translation).

Shi et al., "Convolutional lstm network: A machine learning approach for precipitation nowcasting," Advances in Neural Information Processing Systems, 2015, 9 pages.

\* cited by examiner

CONTROL POLICIES FOR ROBOTIC AGENTS

CROSS-REFERENCE TO RELATED APPLICATION

This application is a National Stage Application under 35 U.S.C. 071 and claims the benefit of International Application No. PCT/US2017/051751, filed Sep. 15, 2017, which claims priority to U.S. Provisional Application Ser. No. 62/395,329, filed on Sep. 15, 2016. The disclosure of the prior application is considered part of and is incorporated by reference in the disclosure of this application

BACKGROUND

This specification relates to selecting actions to be performed by a robotic agent.

Robotic agents interact with an environment by receiving data characterizing a state of the environment, and in response, performing an action in order to attempt to perform a robotic task. Some robotic agents use neural networks to select the action to be performed in response to receiving any given observation.

Neural networks are machine learning models that employ one or more layers of nonlinear units to predict an output for a received input. Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes how a system implemented as computer programs on one or more computers in one or more locations can select actions to be performed by a robotic agent.

In general, one innovative aspect may be embodied in a method that includes: receiving data identifying, for each of one or more objects, a respective target location to which a robotic agent interacting with a real-world environment should move the object. The method further includes causing the robotic agent to move the one or more objects to the one or more target locations by repeatedly performing the following: receiving a current image of a current state of the real-world environment, determining, from the current image, a next sequence of actions to be performed by the robotic agent using a next image prediction neural network that predicts future images based on a current action and an action to be performed by the robotic agent, in which the next sequence is the sequence of a plurality of candidate sequences that, if performed by the robotic agent starting from when the environment is in the current state, would be most likely to result in the one or more objects being moved to the respective target locations, and directing the robotic agent to perform the next sequence of actions. The current image may be an image captured by a camera of the robotic agent.

Directing the robotic agent to perform the next sequence of actions may include: directing the robotic agent to interrupt a current sequence of actions being performed by the robotic agent and to begin performing the next sequence of actions.

The method can further include providing, for presentation to a user, a user interface that allows the user to specify the objects to be moved and the target locations.

The next image prediction neural network can be a recurrent neural network that has been trained to: receive as input at least a current image and an input action, and process the input to generate a next image that is an image of a predicted next state of the environment if the robotic agent performs the input action when the environment is in the current state. As part of generating the next image, the recurrent neural network generates a flow map that identifies, for each of a plurality of pixels in the next image, a respective predicted likelihood of the pixel having moved from each of a plurality of pixels in the current image.

Determining the next sequence of actions may include, determining, using flow maps generated by the next image prediction neural network, a respective likelihood for each of the candidate sequences that performance of the actions in the candidate sequence by the robotic agent would result in the objects being moved to the target locations.

Determining the next sequence of actions may include determining one or more pixels in the current image that depict the one or more objects as currently located in the environment.

Determining the respective likelihood for a given candidate sequence may include recursively feeding as input to the neural network the actions in the sequence and the next images generated by the neural network for the actions.

The method may further comprise sampling the candidate sequences from a distribution over possible action sequences. Sampling the candidate sequences may include: performing multiple iterations of sampling using a cross-entropy technique.

Another innovative aspect may be embodied in one or more computers and one or more storage devices storing instructions that, when executed by the one or more computers, cause the one or more computers to perform the operations of the method described above.

Another innovative aspect may be embodied in one or more non-transitory storage media encoded with instructions that, when executed by one or more computers, cause the one or more computers to perform the operations of the method described above.

Particular embodiments of the subject matter described in this specification can be implemented so as to realize one or more of the following advantages. By using a combination of a learned predictive model and a model-predictive control (MPC)-based controller to select actions to be performed by the robotic agent, the system described in this specification allows the robotic agent to effectively move objects to target locations using only entirely unlabeled training data, i.e., without requiring the use of additional computational resources to label training images or requiring the training images to be labeled by a user. Moreover, the techniques described herein do not require a calibrated camera, an instrumented training set-up, nor precise sensing and actuation by the robotic agent. Additionally, the described techniques enable a robot to handle novel objects not seen during the training of the next image prediction neural network, allowing the techniques described in this specification to better generalize to different tasks and objects.

The details of one or more embodiments of the subject matter of this specification are set forth in the accompanying drawings and the description below. Other features, aspects,

BRIEF DESCRIPTION OF THE DRAWINGS

Like reference numbers and designations in the various drawings indicate like elements.

DETAILED DESCRIPTION

Figure 1:
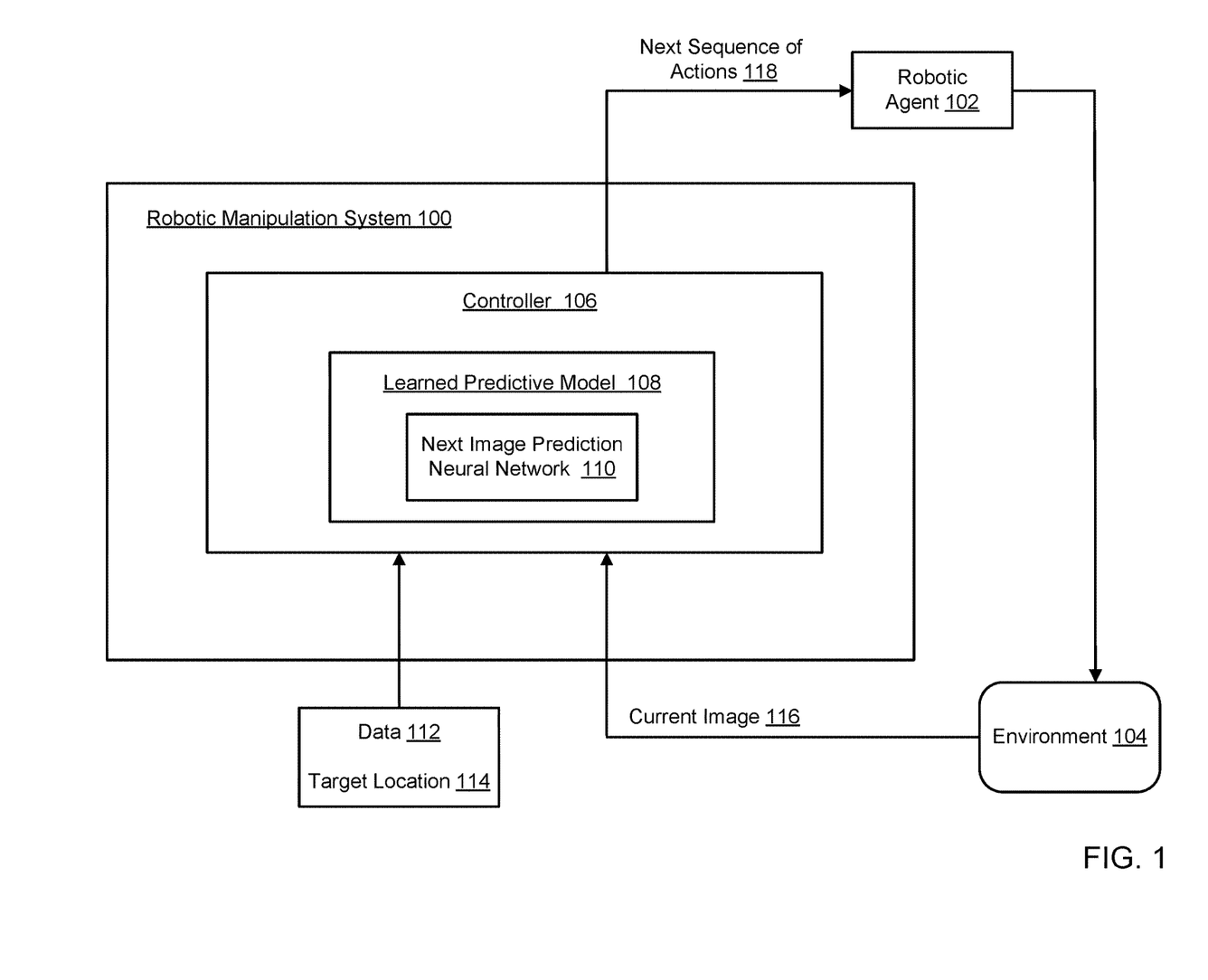
FIG. 1 is a block diagram of an example of a robotic manipulation system.

FIG. 1 is a block diagram of an example of a robotic manipulation system 100. The system 100 is an example of a system implemented as computer programs on one or more computers in one or more locations, in which the systems, components, and techniques described below can be implemented.

In general, the system 100 is configured to select actions to be performed by a robotic agent 102 interacting with a real-world environment 104 so that the agent 102 moves one or more objects from respective initial locations in the environment 104 to respective final locations in the environment 104.

In particular, the system 100 includes a controller 106 that is configured to receive data 112 identifying, for each of one or more objects in the real-world environment 104, a respective target location, e.g., the target location 114, to which the robotic agent 102 should move the object.

In some implementations, the system 100 can provide, for presentation to a user, a user interface that allows the user to specify one or more objects to be moved and the target locations. For example, the user can specify a source pixel in an initial image that depicts an object as currently located in the environment 104, and then specify where the source pixel should be moved to, i.e., another pixel in the initial image. The initial image can be captured by a camera of the robotic agent 102 and characterizes an initial state of the environment 104.

For example, the initial image shows a cup placed in a rectangular tray. The user can specify a source pixel that belongs to the cup in the image, and then specify a target location in the image that the source pixel should be moved to, e.g., a location that is near one of the corners of the rectangular tray. With this goal specification, the system 100 can control the robotic agent to move the cup to the specified corner of the rectangular tray. In some other implementations, instead of receiving data identifying objects to be moved and target locations from a user, the systems can receive the data from one or more other systems, e.g. one or more other robotic systems.

The controller 106 then uses a learned predictive model 108 to control the robotic agent 102 to move the object toward the target location 114.

The learned predictive model 108 includes a next image prediction neural network 110. The next image prediction neural network 110 has been trained to receive as input a current image of a current state of the environment 104 and an input action. An input action can be, for example, pushing an object toward a target location or rotating an object. The neural network 110 then processes the received input to generate a next image that is an image of a predicted next state of the environment if the robotic agent performs the input action when the environment is in the current state. As part of generating the next image, the neural network 110 generates a flow map that identifies, for each of a plurality of pixels in the next image, a respective predicted likelihood of the pixel having moved from each of a plurality of pixels in the current image.

An example of the next image prediction neural network 110 is a recurrent neural network that includes a stack of convolutional long short-term memory (LSTM) neural network layers, one or more convolutional neural network layers, and a set of normalized convolutional kernels. Convolutional LSTM neural network layers are similar to regular LSTM neural network layers, however, their gates are implemented by convolutions instead of fully-connected neural network layers. Convolutional LSTM neural network layers are described in more detail in X. Shi et al. "Convolutional lstm network: A machine learning approach for precipitation nowcasting." *NIPS*, 2015. The above example of the neural network 110 is described in more detail in C. Finn, I. Goodfellow, and S. Levine, "*Unsupervised learning for physical interaction through video prediction*," in Neural Information Processing Systems (NIPS), 2016.

At a given time step, given the target location 114, the controller 106 causes the robotic agent 102 to move the object to the target location. Causing the robotic agent 102 to move the object to the target location includes repeatedly performing the process 200 as described in detail below with reference to FIG. 2 until the object reaches the target location.

For example, the controller 106 receives a current image 116 that characterizes a current state of the environment 104 and then uses the learned predictive model 108 to determine a next sequence of actions 118 to be performed by the robotic agent 102 in order to move the object to the target location 114. Determining a next sequence of actions using the learned predictive model 108 is described in more detail below with reference to FIG. 3. The controller 106 then directs the robotic agent 102 to perform the next sequence of actions 118. If the robotic agent is performing a current sequence of actions, the controller 106 causes the robotic agent 102 to interrupt the current sequence of actions being performed and causes the robotic agent 102 to start performing the next sequence of action 118. After the agent 102 performs one or more actions in the next sequence of actions 118, the controller 106 may receive a new image that characterizes a new state of the environment. The controller 106 updates the current image 116 with the new image and then continues determining another next sequence of actions. The controller 106 can repeatedly determine next sequences of actions until a predetermined number of next sequences have been determined or until the robotic agent 102 has successfully moved the object to the target location 114.

Figure 2:
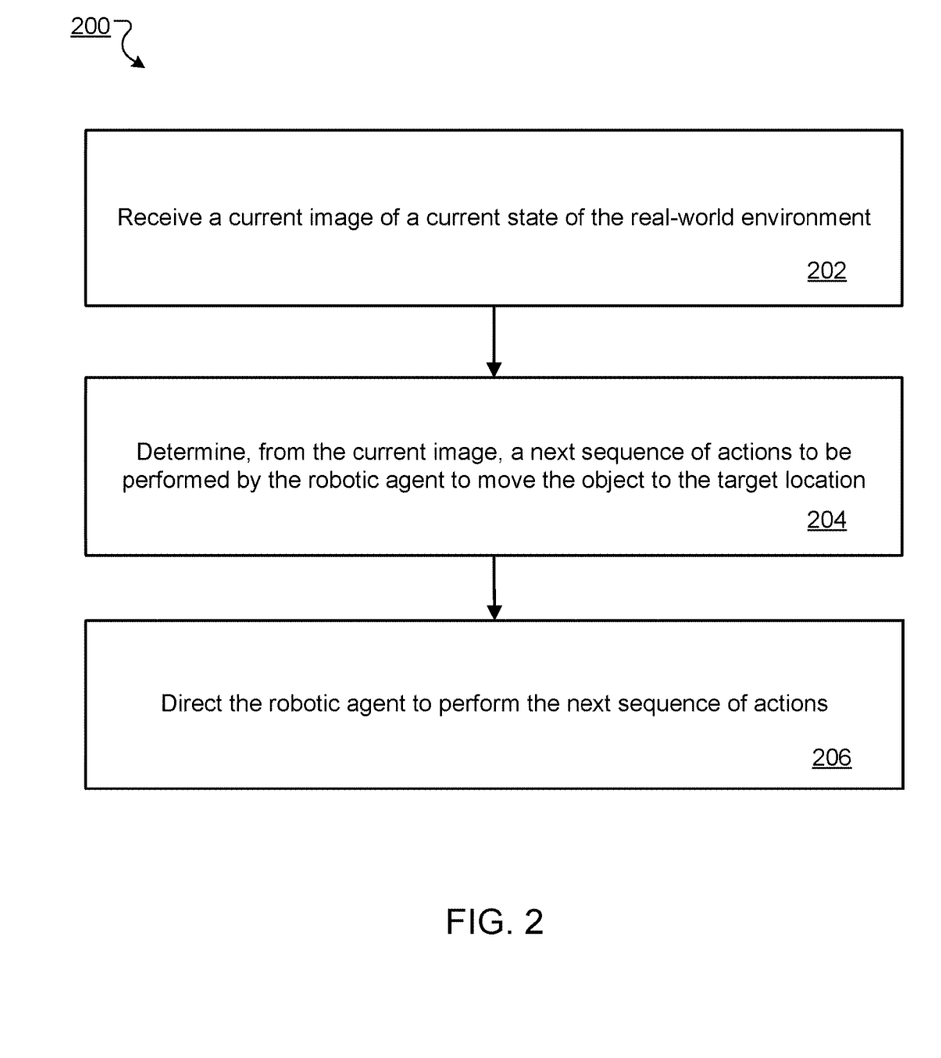
FIG. 2 is a flow diagram of an example process for causing a robotic agent to move an object to a target location.

FIG. 2 is a flow diagram of an example process for causing a robotic agent to move an object to a target location in a real-world environment. For convenience, the process 200 will be described as being performed by a system of one or more computers located in one or more locations. For example, a robotic manipulation system, e.g., the robotic manipulation system 100 of FIG. 1, or a component of a robotic manipulation system, e.g., the controller 106 of FIG. 1, appropriately programmed in accordance with this specification, can perform the process 200.

The system receives a current image of a current state of the real-world environment, e.g., as captured by a camera of the robotic agent (step 202). If the current image is an initial image $I_t$ that depicts an object as initially located in the real-world environment (i.e., depicting the initial state of the real-world environment), the goal is to move a single designated pixel $d_t=(x_d, y_d)$ in the initial image $I_t$ to a target location $g=(x_g, y_g)$ in the initial image $I_t$. If the current image is not the initial image, for example, if the current image is the next image $I_{t+1}$ that depicts the next state of the real-world environment, the system can update the designated pixel from $d_t$ to $d_{t+1}$, for example, by using optical flow computed from image observations $I_{t:t+1}$ and $d_t$. Given that the target doesn't change, the target location $g=(x_g, y_g)$ remains the same in next images predicted by the system.

The system determines, from the current image and using a learned predictive model, a next sequence of actions to be performed by the robotic agent in order to move the object to the target location (step 204). The next sequence is a sequence of multiple candidate sequences that, if performed by the robotic agent starting from when the environment is in the current state, would be most likely to result in the object being moved to the target location.

For example, the system uses the learned predictive model to determine a next sequence of H future actions $a_t^*, \ldots, a_{t+H-1}^*$ that, if performed by the robotic agent would be most likely result in the designated pixel $d_t$ being moved to the target location g.

Determining the next sequence of actions is described in more detail below with reference to FIG. 3.

The system then directs the robotic agent to perform the next sequence of actions (step 206). If the robotic agent is performing a current sequence of actions, the system may cause the robotic agent to interrupt the current sequence of actions being performed and instead cause the agent to start performing the next sequence of action. After the agent has performed the first action in the next sequence of actions, the system receives a new image that characterizes a new state of the environment. In some implementations, the system can receive a new image only after the robotic agent has performed a predetermined number (>1) of actions in the next sequence of actions.

For example, the system directs the agent to perform the determined next sequence of actions $a_t^*, \ldots, a_{t+H-1}^*$. After the agent performs action $a_t^*$ in the sequence, the system receives a new image $I_{t+1}$. The system then updates the designated pixel from $d_t$ to $d_{t+1}$, for example, by using optical flow computed from image observations $I_{t:t+1}$ and $d_t$. The system then uses the learned predictive model to determine, based on the new designated source pixel $I_{t+1}$ and the target location g, a new next sequence of actions to be performed by the robotic agent. The system then directs the robotic agent to interrupt the next sequence of actions being performed and to begin performing the one or more actions in the new next sequence of actions. After the robotic agent has performed the first action in the new next sequence of actions, the system can receive a new image of a new state of the real-world environment and update the designated pixel. In some implementations, the system can receive a new image and update the designated pixel only after the robotic agent has performed several actions in the new next sequence of actions.

The system can repeatedly perform steps 202-206 until the robotic agent successfully moves the object to the target location.

Figure 3:
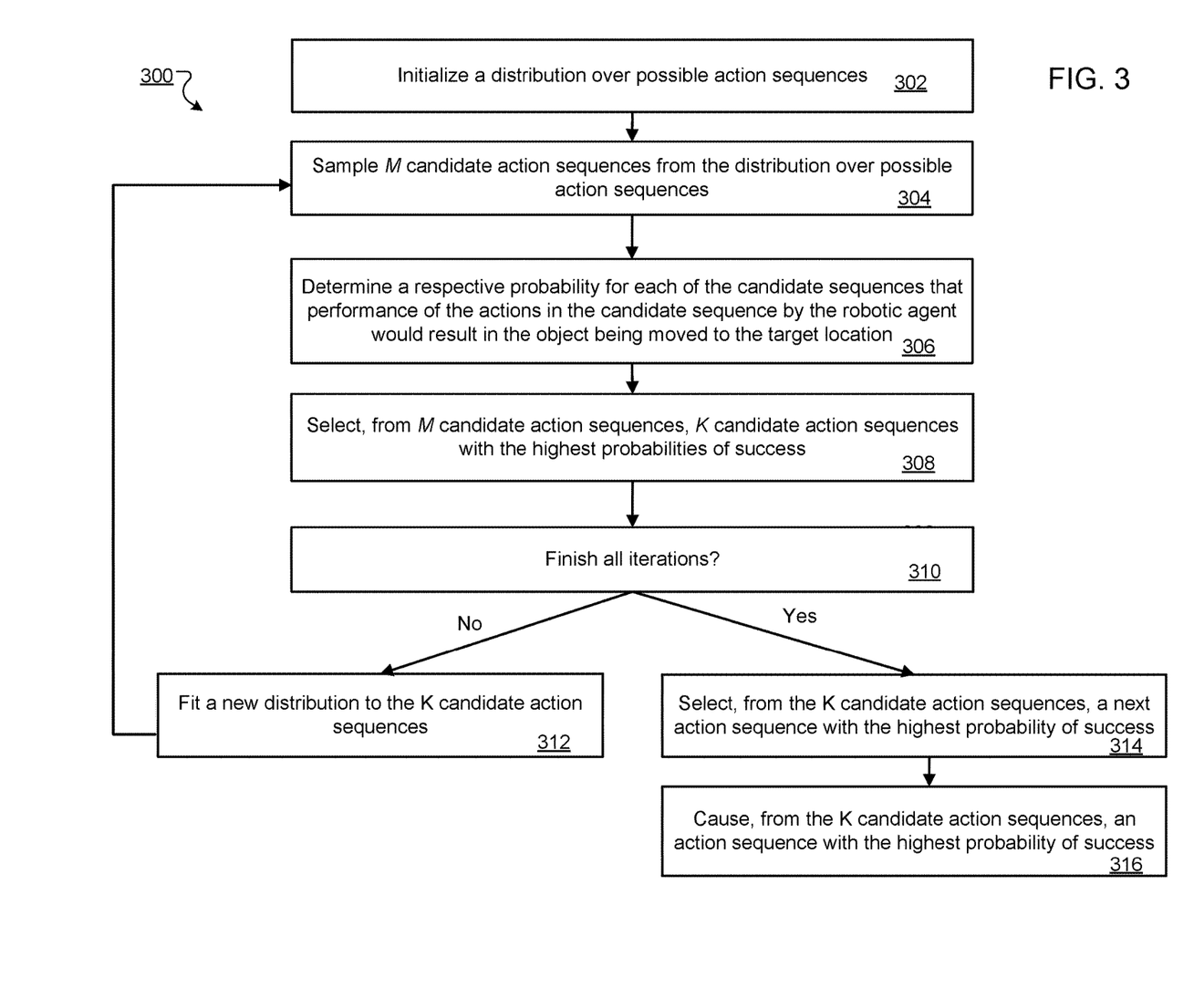
FIG. 3 is a flow diagram of an example process for determining a next sequence of actions to be performed by the robotic agent in order to move an object to a target location.

FIG. 3 is a flow diagram of an example process 300 for determining a next sequence of actions to be performed by the robotic agent in order to move an object to a target location.

For convenience, the process 300 will be described as being performed by a system of one or more computers located in one or more locations. For example, a robotic manipulation system, e.g., the robotic manipulation system 100 of FIG. 1, appropriately programmed in accordance with this specification, can perform the process 300.

Generally, the process 300 includes multiple iterations of sampling candidate action sequences using a cross-entropy technique. In general, the cross-entropy technique involves an iterative procedure where each iteration can be broken down into two phases: (a) generate a random data sample according to a specified mechanism, and (b) update the parameters of the specified mechanism based on this data in order to produce a better sample in the next iteration.

First, at a given time step t, the system initializes a distribution over a set of possible action sequences that could be performed by the robotic agent in order to move the object to the target location (step 302). The initialized distribution can be, for example, a uniform distribution. Each of the possible action sequences has the same length, e.g., each sequence has H actions. The system also specifies a number of iterations J needed for sampling candidate action sequences (J>1). In other words, J is the number of times that the system needs to repeatedly perform steps 304-308 as described below. J can be specified by a user of the system.

The system then samples M candidate action sequences from the distribution (step 304). For example, in the first iteration, the system samples M action sequences $\{a_t^{(m)}, \ldots, a_{t+H-1}^{(m)}\}$ of length H from the initialized uniform distribution.

Next, the system uses a learned predictive model to determine, for each of the M candidate sequences, a respective probability that performance of the actions in the candidate sequence by the robotic agent would result in the object being moved to the target location, e.g. resulting in a designated pixel $d_t$ in the current image $I_t$ being moved to the target location $g=(x_g, y_g)$ in the current image $I_t$ (step 306). The learned predictive model includes a next image prediction neural network that is a recurrent neural network. In particular, for each of the M candidate sequences, the system first feeds as input to the next image prediction neural network a first action in the candidate sequence and the current image that characterizes a current state of the environment. The next image prediction neural network then processes the input to generate a first next image that is an image of a predicted next state of the environment if the robotic agent first performs the first action when the environment is in the current state. As part of generating the first next image, the next image prediction neural network generates a first flow map that identifies, for each of multiple pixels in the first next image, a respective predicted probability (e.g., likelihood) of the pixel having moved from each of the multiple pixels in the current image.

The system then feeds as input to the next image prediction neural network a second action following the first action in the sequence, and the first next image generated by the next image prediction neural network. The next image prediction neural network then processes the input to generate a second next image that is an image of a predicted next state of the environment if the robotic agent performs the second action. While generating the second next image, the next image prediction neural network generates a second flow map that identifies, for each of multiple pixels in the second next image, a respective probability of the pixel having moved from each of the multiple pixels in the current image.

The system recursively feeds as input to the image prediction neural network subsequent actions in the sequence and the next images generated by the neural network for the actions, and the neural network repeatedly processes the inputs to generate next images and corresponding flow maps until all actions in the action sequence have been processed. The flow map generated at each step gives probabilities that each pixel in the next image comes from each pixel in the current image. After the last action in the sequence has been processed, the system now has determined, using the image prediction neural network, a final flow map that identifies, for each of multiple pixels in the final next image $I_{t+H-1}$, a respective probability of the pixel having moved to the final next image $I_{t+H-1}$ from each of the multiple pixels in the current image $I_t$. In other words, the final flow map provides probabilities that each pixel in the final next image $I_{t+H-1}$ comes from each pixel in the current image $I_t$. The system then determines, based on the final flow map and the target location $g=(x_g, y_g)$ (which remains the same in any next image generated by the next image prediction neural network), a probability that the designated pixel $d_t$ in the current image $I_t$ would be moved to the target location g in the final next image if the agent performs the actions in the candidate sequence.

After the system has determined a respective probability for each of the M candidate sequences, the system selects, from the M candidate action sequences, K candidate action sequences that have the highest probabilities (step 308).

The system then determines whether the number of iterations for sampling K candidate action sequences (i.e. steps 304-308) has reached the specified J iterations (step 310).

If the number of iterations has not reached J, the system fits a new distribution to the selected K candidate action sequences (step 312). That is, the system determines a new distribution that fits the selected K candidate action sequences. The new distribution can be, for example, a multivariate Gaussian distribution.

The system then repeats steps 304-312, i.e. re-sampling a new set of M action sequences from a new distribution, determining a respective probability for each of the M candidate sequences, selecting K candidate action sequences from the M candidate sequences, and re-fitting a new distribution, until the system has finished J iterations.

At the end of the last iteration, the system selects, from the K candidate action sequences, an action sequence that has the highest probability that performance of the actions in the sequence would result in the object being moved toward the target location (step 314).

The system then causes the robotic agent to perform one or more actions in the selected action sequence in order to move the object toward the target location (step 316). The system may direct the robotic agent to interrupt a current sequence of actions being performed and to begin performing the selected action sequence.

In view of the above description, it will be appreciated that the systems and methods described herein may provide one or more advantages. For instance, the system may allow a robotic agent to effectively move objects to target locations using a neural network that has been trained using only entirely unlabeled training data. In addition, the system may allow objects to be moved by the robotic agent using a more simplified set-up in which a calibrated camera, an instrumented training set-up, and/or precise sensing and actuation by the robotic agent may not be required. The described techniques may also enable the robot agent to handle novel objects not seen during the training of the next image prediction neural network, thus broadening the potential utility of the system.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models, e.g., predictive models, can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A method comprising:
receiving data identifying, for each of one or more objects, a respective target location to which a robotic agent interacting with a real-world environment should move the object; and
causing the robotic agent to move the one or more objects to one or more target locations by repeatedly performing the following:
receiving a current image of a current state of the real-world environment,
determining, from the current image, a next sequence of actions to be performed by the robotic agent using a next image prediction neural network that predicts future images based on a current action and an action to be performed by the robotic agent,
wherein the next sequence is a candidate sequence from a plurality of candidate sequences that, if performed by the robotic agent starting from when the environment is in the current state, would be most likely to result in the one or more objects being moved to the respective target locations, wherein each of the plurality of candidate sequences includes H actions, and
wherein determining the next sequence of actions comprises:
for each of the plurality of candidate sequences:
for a first action in the candidate sequence that includes the H actions, providing as input to the next image prediction neural network the first action and a current image that characterizes a current state of the environment, and processing the first action and the current image using the next image prediction neural network to generate a first next image that is an image of a predicted next state of the environment if the robotic agent first performs the first action when the environment is in the current state, wherein generating the first next image comprises generating a first flow map that gives probabilities that each pixel in the first next image comes from each pixel in the current image,
for each particular action following the first action in the candidate sequence that includes the H actions, providing as input to the next image prediction neural network (i) the particular action and (ii) a preceding next image that was generated by the next image prediction neural network for a preceding action, and processing the particular action and the preceding next image using the next image prediction neural network to generate a new next image that is an image of a predicted next state of the environment if the robotic agent performs the particular action, wherein generating the new next image comprises generating a new flow map that gives probabilities that each pixel in the new next image comes from each pixel in the preceding next image,
obtaining, using the next image prediction neural network, a final flow map for a final next image in the candidate sequence of H actions, the final next image being is an image of a predicted final state of the environment if the robotic agent performs all H actions in the candidate sequence, the final flow map giving probabilities that each pixel in the final next image comes from each pixel in the current image that characterizes the current state of the environment, and
determining, based on the final flow map and the target location, a probability that performance of all H actions in the candidate sequence by the robotic agent would result in the one or more objects being moved to the respective target locations in the final next image, and
selecting, from the plurality of candidate sequences, the candidate sequence with a highest probability as the next sequence of actions, and
directing the robotic agent to perform the next sequence of actions,
wherein the next image prediction neural network is configured to receive as input at least a current image and an input action and to process the input to generate a next image that is an image of a predicted next state of the environment if the robotic agent performs the input action when the environment is in the current state.

2. The method of claim 1, wherein the current image is an image captured by a camera of the robotic agent.

3. The method of claim 1, further comprising:
providing, for presentation to a user, a user interface that allows the user to specify the objects to be moved and the target locations.

4. The method of claim 1, wherein directing the robotic agent to perform the next sequence of actions comprises:
directing the robotic agent to interrupt a current sequence of actions being performed by the robotic agent and to begin performing the next sequence of actions.

5. The method of claim 1, wherein the next image prediction neural network is a recurrent neural network.

6. The method of claim 1, wherein determining the next sequence of actions comprises:
determining one or more pixels in the current image that depict the one or more objects as currently located in the environment.

7. The method of claim 1, further comprising:
sampling the candidate sequences from a distribution over possible action sequences.

8. The method of claim 7, wherein sampling the candidate sequences comprises:
performing multiple iterations of sampling using a cross-entropy technique.

9. A system comprising one or more computers and one or more storage devices, the one or more storage devices storing instructions that, when executed by the one or more computers, cause the one or more computers to perform operations comprising: receiving data identifying, for each of one or more objects, a respective target location to which a robotic agent interacting with a real-world environment should move the object; and
causing the robotic agent to move the one or more objects to one or more target locations by repeatedly performing the following:
receiving a current image of a current state of the real-world environment,
determining, from the current image, a next sequence of actions to be performed by the robotic agent using a next image prediction neural network that predicts future images based on a current action and an action to be performed by the robotic agent, wherein the next sequence is a candidate sequence from a plurality of candidate sequences that, if performed by the robotic agent starting from when the environment is in the current state, would be most likely to result in the one or more objects being moved to the respective target locations, wherein each of the plurality of candidate sequences includes H actions, and wherein determining the next sequence of actions comprises:

for each of the plurality of candidate sequences:

for a first action in the candidate sequence that includes the H actions, providing as input to the next image prediction neural network the first action and a current image that characterizes a current state of the environment, and processing the first action and the current image using the next image prediction neural network to generate a first next image that is an image of a predicted next state of the environment if the robotic agent first performs the first action when the environment is in the current state, wherein generating the first next image comprises generating a first flow map that gives probabilities that each pixel in the first next image comes from each pixel in the current image, for each particular action following the first action in the candidate sequence that includes the H actions, providing as input to the next image prediction neural network (i) the particular action and (ii) a preceding next image that was generated by the next image prediction neural network for a preceding action, and processing the particular action and the preceding next image using the next image prediction neural network to generate a new next image that is an image of a predicted next state of the environment if the robotic agent performs the particular action, wherein generating the new next image comprises generating a new flow map that gives probabilities that each pixel in the new next image comes from each pixel in the preceding next image, obtaining, using the next image prediction neural network, a final flow map for a final next image in the candidate sequence of H actions, the final next image being an image of a predicted final state of the environment if the robotic agent performs all H actions in the candidate sequence, the final flow map giving probabilities that each pixel in the final next image comes from each pixel in the current image that characterizes the current state of the environment, and determining, based on the final flow map and the target location, a probability that performance of all H actions in the candidate sequence by the robotic agent would result in the one or more objects being moved to the respective target locations in the final next image, and selecting, from the plurality of candidate sequences, the candidate sequence with a highest probability as the next sequence of actions, and directing the robotic agent to perform the next sequence of actions, wherein the next image prediction neural network is configured to receive as input at least a current image and an input action and to process the input to generate a next image that is an image of a predicted next state of the environment if the robotic agent performs the input action when the environment is in the current state.

10. The system of claim 9, wherein directing the robotic agent to perform the next sequence of actions comprises:
directing the robotic agent to interrupt a current sequence of actions being performed by the robotic agent and to begin performing the next sequence of actions.

11. The system of claim 9, wherein the next image prediction neural network is a recurrent neural network.

12. The system of claim 9, wherein determining the next sequence of actions comprises:
determining one or more pixels in the current image that depict the one or more objects as currently located in the environment.

13. The system of claim 9, wherein the operations further comprises:
sampling the candidate sequences from a distribution over possible action sequences.

14. The system of claim 13, wherein sampling the candidate sequences comprises:
performing multiple iterations of sampling using a cross-entropy technique.

15. One or more non-transitory computer storage media encoded with instructions that, when executed by one or more computers, cause the one or more computers to perform operations comprising: receiving data identifying, for each of one or more objects, a respective target location to which a robotic agent interacting with a real-world environment should move the object; and causing the robotic agent to move the one or more objects to one or more target locations by repeatedly performing the following:

receiving a current image of a current state of the real-world environment, determining, from the current image, a next sequence of actions to be performed by the robotic agent using a next image prediction neural network that predicts future images based on a current action and an action to be performed by the robotic agent, wherein the next sequence is a candidate sequence from a plurality of candidate sequences that, if performed by the robotic agent starting from when the environment is in the current state, would be most likely to result in the one or more objects being moved to the respective target locations, wherein each of the plurality of candidate sequences includes H actions, and wherein determining the next sequence of actions comprises:

for each of the plurality of candidate sequences:

for a first action in the candidate sequence that includes the H actions, providing as input to the next image prediction neural network the first action and a current image that characterizes a current state of the environment, and processing the first action and the current image using the next image prediction neural network to generate a first next image that is an image of a predicted next state of the environment if the robotic agent first performs the first action when the environment is in the current state, wherein generating the first next image comprises generating a first flow map that gives probabilities that each pixel in the first next image comes from each pixel in the current image, for each particular action following the first action in the candidate sequence that includes the H actions, providing as input to the next image prediction neural network (i) the particular action and (ii) a preceding next image that was generated by the next image prediction neural network for a preceding action, and processing the particular action and the preceding next image using the next image prediction neural network to generate a new next image that is an image of a predicted next state of the environment if the robotic agent performs the particular action, wherein generating the new next image comprises generating a new flow map that gives probabilities that each pixel in the new next image comes from each pixel in the preceding next image, obtaining, using the next image prediction neural network, a final flow map for a final next image in the candidate sequence of H actions, the final next image being an image of a predicted final state of the environment if the robotic agent performs all H actions in the candidate sequence, the final flow map giving probabilities that each pixel in the final next image comes from each pixel in the current image that characterizes the current state of the environment, and determining, based on the final flow map and the target location, a probability that performance of all H actions in the candidate sequence by the robotic agent would result in the one or more objects being moved to the respective target locations in the final next image, and selecting, from the plurality of candidate sequences, the candidate sequence with a highest probability as the next sequence of actions, and directing the robotic agent to perform the next sequence of actions, wherein the next image prediction neural network is configured to receive as input at least a current image and an input action and to process the input to generate a next image that is an image of a predicted next state of the environment if the robotic agent performs the input action when the environment is in the current state.

16. The one or more non-transitory computer storage media of claim 15, wherein directing the robotic agent to perform the next sequence of actions comprises:

directing the robotic agent to interrupt a current sequence of actions being performed by the robotic agent and to begin performing the next sequence of actions.

* * * * *

UNITED STATES PATENT AND TRADEMARK OFFICE
CERTIFICATE OF CORRECTION

| | | |
|---|---|---|
| PATENT NO. | : 11,853,876 B2 | Page 1 of 1 |
| APPLICATION NO. | : 16/332961 | |
| DATED | : December 26, 2023 | |
| INVENTOR(S) | : Finn et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 977 days.

Signed and Sealed this
Eighth Day of July, 2025

Coke Morgan Stewart
*Acting Director of the United States Patent and Trademark Office*